United States Patent
Funnell

(10) Patent No.: US 8,391,204 B2
(45) Date of Patent: Mar. 5, 2013

(54) METHOD AND APPARATUS FOR SETTING AN INTEGRITY PROTECTION UPLINK APPLICATION TIME FOR SIGNALLING BEARER RB0 IN A UNIVERSAL MOBILE TELECOMMUNICATIONS SYSTEM

(75) Inventor: Nicola Funnell, Warwickshire (GB)

(73) Assignee: Research In Motion Limited, Waterloo (CA)

( * ) Notice: Subject to any disclaimer, the term of this patent is extended or adjusted under 35 U.S.C. 154(b) by 2640 days.

(21) Appl. No.: 10/931,265

(22) Filed: Aug. 31, 2004

(65) Prior Publication Data

US 2005/0169210 A1    Aug. 4, 2005

(30) Foreign Application Priority Data

Nov. 11, 2003 (MX) .................. PA/A/2003/010315

(51) Int. Cl.
*H04W 4/00* (2009.01)

(52) U.S. Cl. ........ 370/328; 370/310; 370/335; 455/403; 455/466

(58) Field of Classification Search ............... 370/310, 370/328, 335; 455/403, 466
See application file for complete search history.

(56) References Cited

U.S. PATENT DOCUMENTS 7,020,455 B2 *   3/2006   Krishnarajah et al. ........ 455/410

* cited by examiner

*Primary Examiner* — Patrick Edouard
*Assistant Examiner* — Matthew Genack

(57) ABSTRACT

The details of an apparatus and method are disclosed for setting the Uplink RRC message sequence number for a new integrity protection configuration to be applied for signalling radio bearer RB0, on completion of a UTRAN MOBILITY INFORMATION procedure. The sequence number is set to a value such that the next RRC message to be sent on uplink RB0 will use the new integrity protection configuration.

7 Claims, 5 Drawing Sheets

METHOD AND APPARATUS FOR SETTING AN INTEGRITY PROTECTION UPLINK APPLICATION TIME FOR SIGNALLING BEARER RB0 IN A UNIVERSAL MOBILE TELECOMMUNICATIONS SYSTEM

CROSS REFERENCE TO RELATED APPLICATION

This application claims priority under 35 U.S.C. §119 to Mexican Patent Application No. PA/a/2003/010315, filed Nov. 11, 2003, the contents of which are incorporated herewith.

BACKGROUND

1. Technical Field

This application relates to UMTS (Universal Mobile Telecommunications System) in general, and to a method and apparatus for setting an integrity protection uplink application time for signalling bearer RB0 in a universal mobile telecommunications system in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.16.0, referred to herein as the 25.331 specification, addresses the subject of UMTS RRC (Radio Resource Control) protocol requirements between the UMTS Terrestrial Radio Access Network (UTRAN) and the UE.

Section 8.5.10 of the 25.331 specification describes integrity protection for RRC connections. The information element IE 'Integrity protection mode info' defines a new integrity protection configuration. Section 8.6.3.5.3 defines the setting of the uplink activation time for integrity protection for signalling radio bearer RB0, and is applicable for each of the SECURITY MODE COMMAND, RECONFIGURATION AND CELL UPDATE CONFIRM procedures. The activation time is the time, expressed in terms of a sequence number SN, at which a new integrity protection configuration is to be applied for signalling radio bearer RB0. In each of these cases, sections 8.1.12.3, 8.2.2.3 and 8.3.1.6 respectively state that when each procedure completes, the uplink message sequence number for radio bearer RB0 should be increased to a value such that the next RRC message to be sent on uplink RB0 will use the new integrity protection configuration.

The UTRAN MOBILITY INFORMATION procedure is a further procedure which may change the integrity protection configuration. However, the setting of the uplink message sequence number for this procedure is undefined, so that a new integrity protection configuration on RB0 may not be used for quite some time, thus compromising the security of the system.

SUMMARY

It is an object of the present application that an apparatus and method according to the invention may enable a UE to appropriately set the UE sequence number to meet the chosen activation time for integrity protection for RB0 for the UTRAN MOBILITY INFORMATION procedure.

According to the present invention, there is provided a method of setting an uplink application time for a new integrity protection configuration to be applied for signalling radio bearer RB0 in a UMTS communications system, the method comprising receiving a UTRAN MOBILITY INFORMATION message at a user equipment, the message indicating that a new integrity protection configuration is to be applied, transmitting a UTRAN MOBILITY INFORMATION CONFIRM message to the UTRAN including an activation time for applying the new integrity protection configuration for RB0, receiving confirmation of receipt of the UTRAN MOBILITY INFORMATION CONFIRM message at the UTRAN and, in response to the confirmation, setting the uplink application time for RB0 to a value such that the next RRC message to be sent on uplink RB0 will use the new integrity protection configuration.

The step of setting the uplink application time may comprise setting a message sequence number referred to as the 'Uplink RRC message sequence number'. This may be set to the selected activation time.

According to the invention, there is also provided a user equipment for setting an uplink application time for a new integrity protection configuration to be applied for signalling radio bearer RB0 in a UMTS communications system, the user equipment comprising a receiver for receiving a UTRAN MOBILITY INFORMATION message from a UTRAN, the message indicating that a new integrity protection configuration is to be applied, a control module for selecting an activation time for applying the new integrity protection configuration for RB0, and a transmitter for transmitting a UTRAN MOBILITY INFORMATION CONFIRM message to the UTRAN including the selected activation time, wherein the control module is further arranged to receive confirmation of receipt of the UTRAN MOBILITY INFORMATION CONFIRM message at the UTRAN and, in response to the confirmation, to set the uplink application time for RB0 to a value such that the next RRC message to be sent on uplink RB0 will use the new integrity protection configuration.

The control module may comprise a sequence number setting (SNS) RRC layer.

The uplink application time may comprise a message sequence number referred to as the 'Uplink RRC message sequence number', and the control module may be configured to set the Uplink RRC message sequence number to the selected activation time.

Other aspects and features of the present application will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

Figure 1:
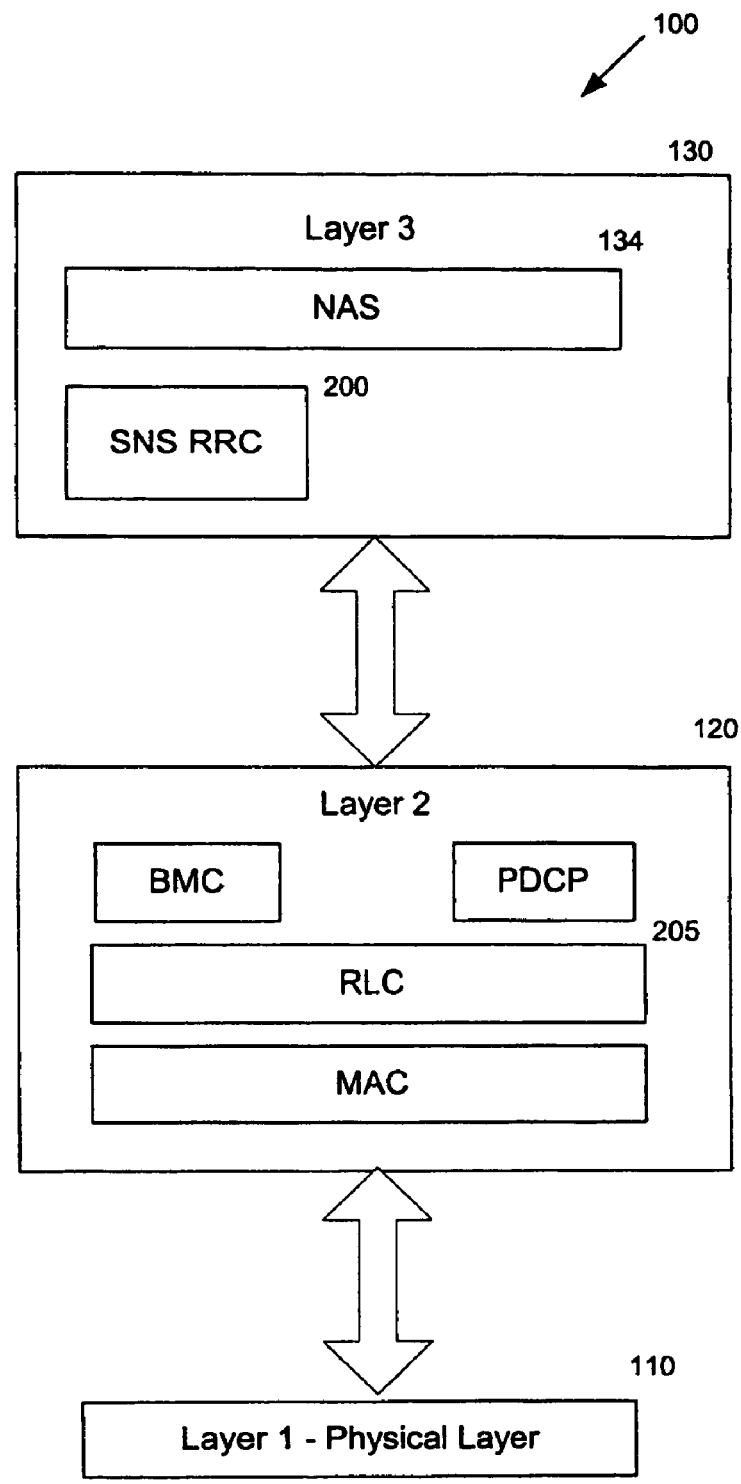
FIG. 1 is a block diagram illustrating an embodiment of a protocol stack apparatus provided with a Sequence Number Setting Radio Resource Control module (SNS RRC), in accordance with the present invention.

Referring to the drawings, FIG. 1 is a block diagram illustrating an embodiment of a protocol stack apparatus provided with a Sequence Number Setting Radio Resource Control module (SNS RRC), in accordance with the present invention.

The SNS RRC module 200 is a sub layer of Layer 3 130 of a UMTS protocol stack 100. The SNS RRC 200 exists in the control plane only and provides an information transfer service to the non-access stratum NAS 134. The SNS RRC 200 is responsible for controlling the configuration of interface Layer 1 110 and Layer 2 120.

When the UTRAN wishes to change the integrity protection configuration of the UE, it will issue a message to the UE containing a command to invoke a specific RRC procedure. The SNS RRC 200 layer of the UE decodes this message and initiates the appropriate RRC procedure. Generally, when the procedure has completed (either successfully or not) then the SNS RRC sends a response message to the UTRAN informing it of the outcome of the procedure.

The protocol stack 100 also includes an RLC layer 205 which is a sub layer of Layer 2 120, providing an RLC confirmation service for communications between the UE and UTRAN, as will be described in more detail below.

Figure 2:
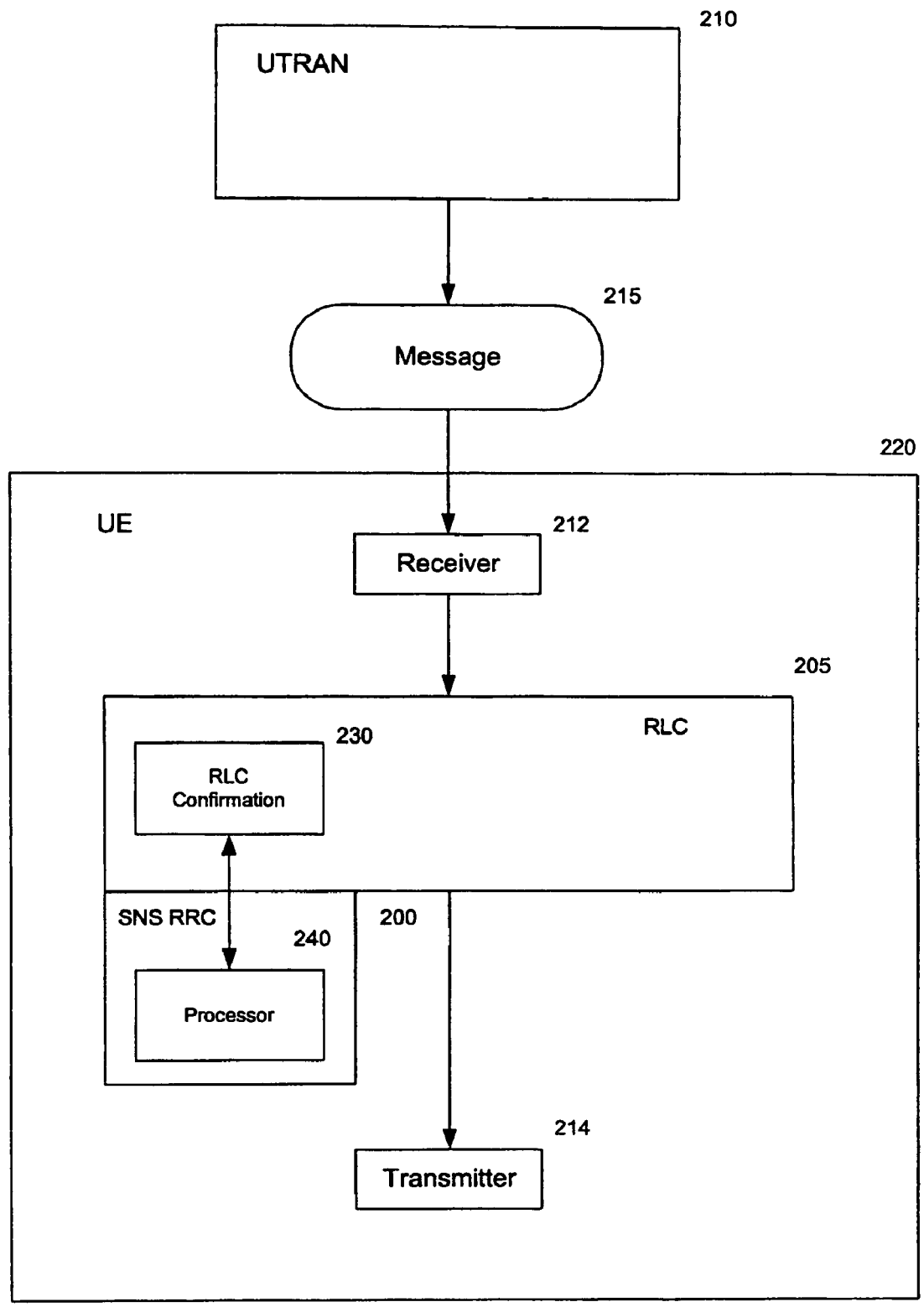
FIG. 2 is a block diagram illustrating in greater detail the SNS RRC 200 module and the RLC layer 205 of FIG. 1.
Figure 3:
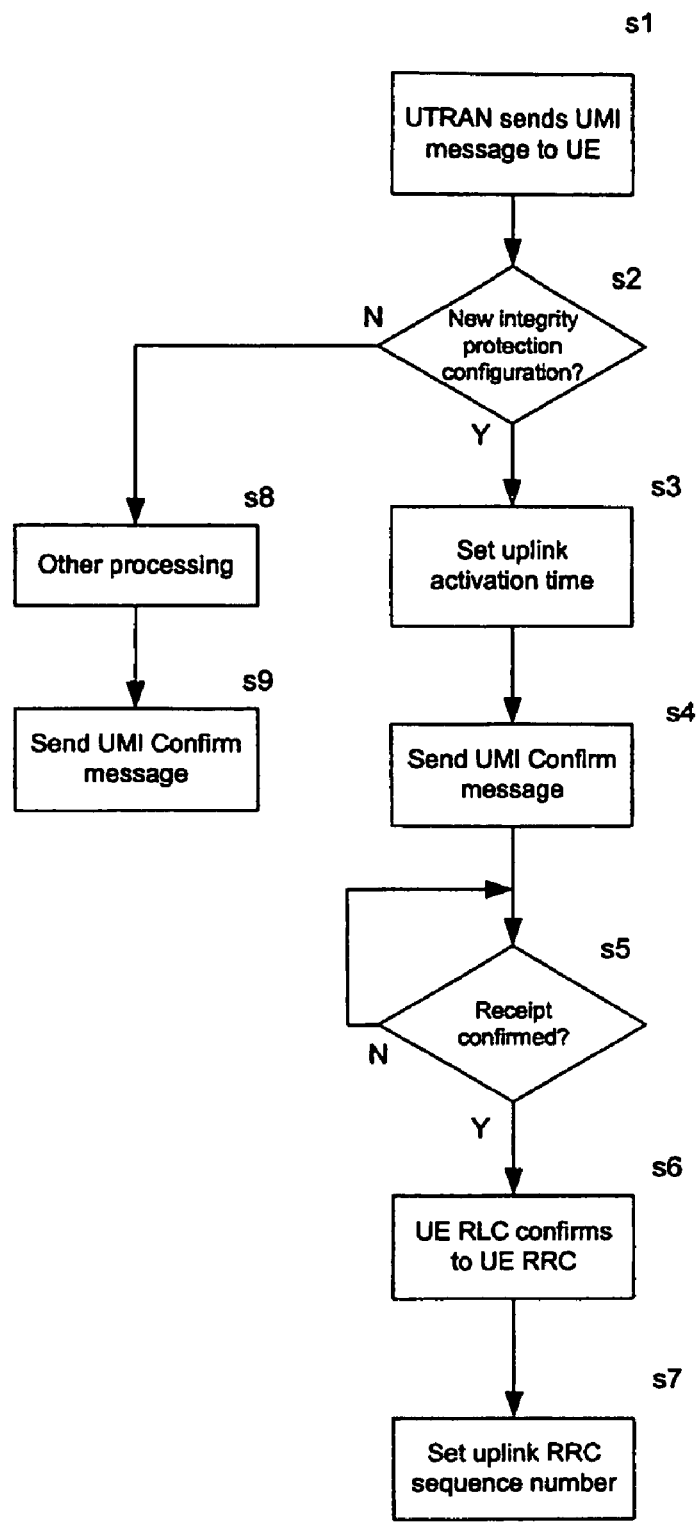
FIG. 3 illustrates the functionality of the processing module 240 shown schematically in FIG. 2.

FIG. 2 is a block diagram illustrating in greater detail the SNS RRC 200 module and the RLC layer 205 of FIG. 1. The RLC layer 205 includes a confirmation module 230 for handling confirmation of message receipt at the UTRAN 210 and the RRC layer 200 includes a processing module 240. FIG. 3 illustrates the functionality of the processing module 240 shown schematically in FIG. 2, while FIG. 4 is a message sequence chart illustrating the flow of messages between UE and UTRAN.

Figure 4:
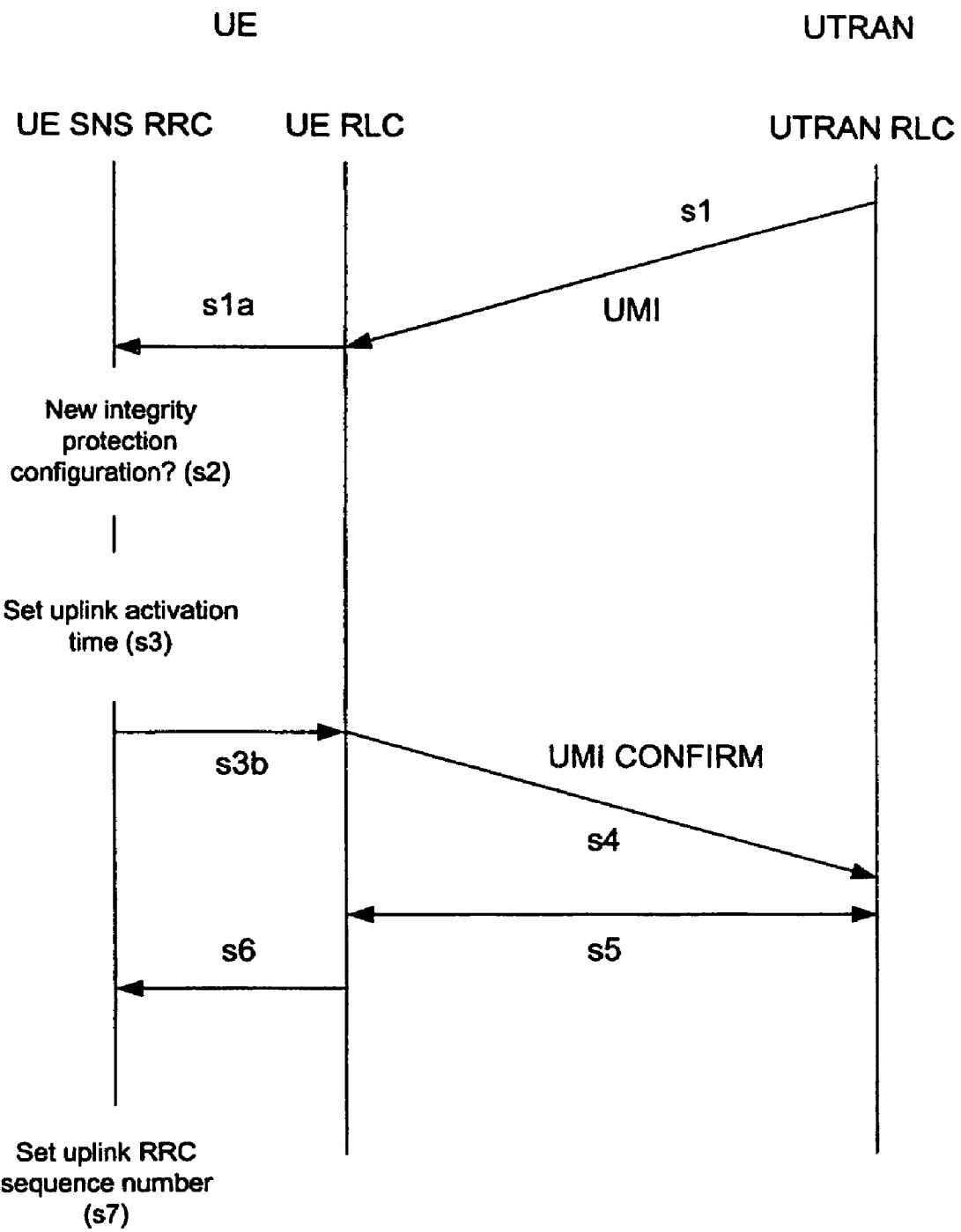
FIG. 4 is a message sequence chart illustrating the flow of messages between UE and UTRAN.

Referring to FIGS. 3 and 4, the UTRAN sends a UTRAN MOBILITY INFORMATION message, abbreviated for the purpose of the drawings to UMI, to the UE (step s1). The UE RLC layer 205 forwards the message to the UE SNSRRC layer 200 in a conventional way (step s1a, not shown in FIG. 3). The SNS RRC module 200 determines whether the message indicates that a new integrity protection configuration is to be applied (step s2). If so, the message will include a downlink activation time set by the UTRAN in an information element (IE) 'Integrity Protection Mode info'. In this case, the SNS RRC module 200 sets the uplink activation time for integrity protection for RB0 in accordance with section 8.6.3.5.3 of the 25.331 specification (step s3). This information is passed to the UE RLC layer 205 (step s3b) and included in a UTRAN MOBILITY INFORMATION CONFIRM message which is sent to the UTRAN (step s4). Confirmation of receipt of the UTRAN MOBILITY INFORMATION CONFIRM message is handled by the RLC layer 205 (step s5) as is well known in the art. Once the UE RLC layer 205 receives confirmation from the UTRAN RLC layer that all of the protocol data units (PDUs) making up the UTRAN MOBILITY INFORMATION CONFIRM message have been successfully received by the UTRAN, the confirmation module 230 confirms to the SNS RRC layer 200 that the UTRAN has received the UTRAN MOBILITY INFORMATION CONFIRM message (step s6). The SNS RRC module 200 then sets the Uplink RRC Message sequence number for signalling radio bearer RB0 in the variable INTEGRITY_PROTECTION_INFO to a value such that the next RRC message to be sent on uplink RB0 will use the new integrity protection configuration (step s7). For example, the Uplink RRC sequence number is increased to the chosen uplink activation time.

If the original UTRAN MOBILITY INFORMATION message did not include a new integrity protection configuration (step s2), any other required processing is carried out in the usual way in accordance with the 25.331 specification (step s8), prior to transmission of the UTRAN MOBILITY INFORMATION CONFIRM message (step s9).

Figure 5:
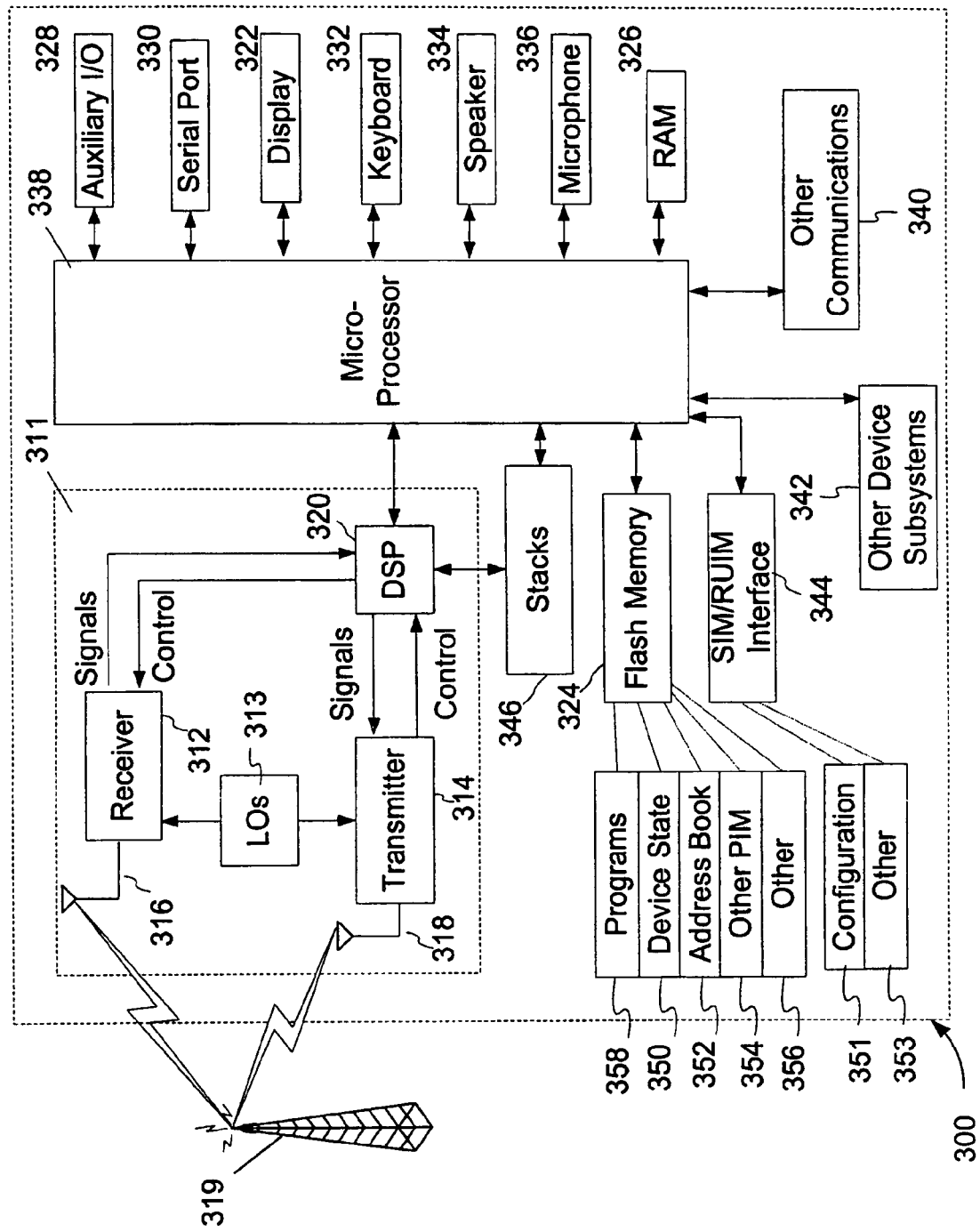
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 300 is preferably a two-way wireless communication device having at least voice and data communication capabilities. Mobile station 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. For example, mobile station 300 may include a communication subsystem 311 designed to operate within the Mobitex™ mobile communication system, the DataTAC™ mobile communication system, a GPRS network, a UMTS network, or an EDGE network.

Network access requirements will also vary depending upon the type of network 319. For example, in the Mobitex and DataTAC networks, mobile station 300 is registered on the network using a unique identification number associated with each mobile station. In UMTS and GPRS networks, however, network access is associated with a subscriber or user of mobile station 300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 300 will be unable to carry out any other functions involving communications over the network 300. The SIM interface 344 is normally similar to a card-slot into which a SIM card can be inserted and ejected like a diskette or PCMCIA card. The SIM card can have approximately 64K of memory and hold many key configuration 351, and other information 353 such as identification, and subscriber related information.

When required network registration or activation procedures have been completed, mobile station 300 may send and receive communication signals over the network 319. Signals received by antenna 316 through communication network 319 are input to receiver 312, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile station 300 preferably includes a microprocessor 338 which controls the overall operation of the device. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 5 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile station. A predetermined set of applications that control basic operations, including at least data and voice communication applications for example, will normally be installed on mobile station 300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile station user's corresponding data items stored or associated with a host computer system. Further applications may also be loaded onto the mobile station 300 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile station 300.

In a data communication mode, a received signal such as a text message or web page download will be processed by the communication subsystem 311 and input to the microprocessor 338, which preferably further processes the received signal for output to the display 322, or alternatively to an auxiliary I/O device 328. A user of mobile station 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile station 300 is similar, except that received signals would preferably be output to a speaker 334 and signals for transmission would be generated by a microphone 336. Alternative voice or audio I/O subsystems, such as a voice message recording subsystem, may also be implemented on mobile station 300. Although voice or audio signal output is preferably accomplished primarily through the speaker 334, display 322 may also be used to provide an indication of the identity of a calling party, the duration of a voice call, or other voice call related information for example.

Serial port 330 in FIG. 5, would normally be implemented in a personal digital assistant (PDA)-type mobile station for which synchronization with a user's desktop computer (not shown) may be desirable, but is an optional device component. Such a port 330 would enable a user to set preferences through an external device or software application and would extend the capabilities of mobile station 300 by providing for information or software downloads to mobile station 300 other than through a wireless communication network. The alternate download path may for example be used to load an encryption key onto the device through a direct and thus reliable and trusted connection to thereby enable secure device communication.

Other communications subsystems 340, such as a short-range communications subsystem, is a further optional component which may provide for communication between mobile station 300 and different systems or devices, which need not necessarily be similar devices. For example, the subsystem 340 may include an infrared device and associated circuits and components or a Bluetooth™ communication module to provide for communication with similarly enabled systems and devices.

When mobile device 300 is used as a UE, protocol stacks 346 include a method and apparatus for setting an integrity protection uplink application time for signalling bearer RB0 in a universal mobile telecommunications system.

The above-described embodiments of the present application are intended to be examples only. Those of skill in the art may effect alterations, modifications and variations to the particular embodiments without departing from the scope of the application as defined by the appended claims.

I claim:

1. A method for setting an uplink application time for a new integrity protection configuration to be applied for signalling radio bearer RB0 in a UMTS communications system, the method comprising:
   receiving a UTRAN MOBILITY INFORMATION message at a user equipment, the message indicating that a new integrity protection configuration is to be applied;
   transmitting a UTRAN MOBILITY INFORMATION CONFIRM message to the UTRAN including an activation time for applying the new integrity protection configuration for RB0; and
   receiving confirmation of receipt of the UTRAN MOBILITY INFORMATION CONFIRM message at the UTRAN and, in response to the confirmation, setting the uplink application time for RB0 to a value such that the next RRC message to be sent on uplink RB0 will use the new integrity protection configuration.

2. A method according to claim 1, wherein the step of setting the uplink application time comprises setting a message sequence number referred to as the 'Uplink RRC message sequence number'.

3. A method according to claim 2, comprising setting the Uplink RRC message sequence number to the activation time.

4. A user equipment for setting an uplink application time for a new integrity protection configuration to be applied for signalling radio bearer RB0 in a UMTS communications system, the user equipment comprising:
   a receiver for receiving a UTRAN MOBILITY INFORMATION message from a UTRAN, the message indicating that a new integrity protection configuration is to be applied;
   a control module for selecting an activation time for applying the new integrity protection configuration for RB0; and
   a transmitter for transmitting a UTRAN MOBILITY INFORMATION CONFIRM message to the UTRAN including the selected activation time;
   wherein the control module is further arranged to receive confirmation of receipt of the UTRAN MOBILITY INFORMATION CONFIRM message at the UTRAN and, in response to the confirmation, to set the uplink application time for RB0 to a value such that the next RRC message to be sent on uplink RB0 will use the new integrity protection configuration.

5. A user equipment according to claim 4, wherein the control module comprises a sequence number setting (SNS) RRC layer.

6. A user equipment according to claim 4, wherein the uplink application time comprises a message sequence number referred to as the 'Uplink RRC message sequence number'.

7. A user equipment according to claim 6, wherein the control module is configured to set the Uplink RRC message sequence number to the selected activation time.

* * * * *